US012767482B2

(12) United States Patent
Schauenburg et al.

(10) Patent No.: US 12,767,482 B2
(45) Date of Patent: Oct. 20, 2026

(54) TRANSPORT VEHICLE FOR A TEXTILE MILL

(71) Applicant: Saurer Technologies GmbH & Co. KG, Krefeld (DE)

(72) Inventors: Markus Schauenburg, Rechberghausen (DE); Steffen Weinert, Mönchengladbach (DE); Wolfgang Leupers, Mönchengladbach (DE)

(73) Assignee: Saurer Technologies Gmbh & Co. KG, Krefeld (DE)

( * ) Notice: Subject to any disclaimer, the term of this patent is extended or adjusted under 35 U.S.C. 154(b) by 411 days.

(21) Appl. No.: 18/567,291

(22) PCT Filed: Jun. 2, 2022

(86) PCT No.: PCT/EP2022/065030
§ 371 (c)(1),
(2) Date: Dec. 5, 2023

(87) PCT Pub. No.: WO2022/258480
PCT Pub. Date: Dec. 15, 2022

(65) Prior Publication Data
US 2024/0262661 A1 Aug. 8, 2024

(30) Foreign Application Priority Data
Jun. 9, 2021 (DE) ......................... 102021114824.3

(51) Int. Cl.
*B65H 67/06* (2006.01)
*B66F 9/06* (2006.01)

(52) U.S. Cl.
CPC ........... *B65H 67/065* (2013.01); *B65H 67/06* (2013.01); *B66F 9/063* (2013.01); *B65H 2515/10* (2013.01); *B65H 2701/31* (2013.01)

(58) Field of Classification Search
CPC ...... B65H 67/02; B65H 67/06; B65H 67/064; B65H 67/065; B65H 2701/31;
(Continued)

(56) References Cited

U.S. PATENT DOCUMENTS 4,340,187 A 7/1982 Schippers et al.
5,138,828 A 8/1992 Stahlecker
(Continued)

FOREIGN PATENT DOCUMENTS

CN 108147221 A 6/2018
CN 109355745 A * 2/2019 ............... D01H 9/10
(Continued)

OTHER PUBLICATIONS

Translation JP H05106127.*
(Continued)

*Primary Examiner* — Shaun R Hurley
(74) *Attorney, Agent, or Firm* — FLYNN THIEL, P.C.

(57) ABSTRACT

A transport vehicle having a driving unit, a carrying unit on the driving unit, the carrying unit having an upper carrying surface for carrying a package unit which can have a textile material loaded thereon. The transport vehicle has a loading and unloading device with a loading and unloading arm having a conveyor unit for loading the textile material onto and from the package unit. The package unit can be a package buffer on the upper carrying surface and having storage points for storing at least one wound or non-wound tube body, and/or by a tube handling unit arranged on the carrying unit at least for autonomously handling the tube body which can be stored in at least one storage point. The loading and unloading device is on the carrying unit or the package unit to load and unload the storage point with the loading and unloading device.

11 Claims, 4 Drawing Sheets

(58) Field of Classification Search

CPC ........ B65H 49/16; B66F 9/063; B25J 19/021; B25J 5/007; B25J 9/1679; B25J 11/00

See application file for complete search history.

(56) References Cited

U.S. PATENT DOCUMENTS

| | | | |
|---|---|---|---|
| 5,359,844 | A | 11/1994 | Schwalm |
| 6,260,783 | B1 | 7/2001 | Realff et al. |
| 10,265,865 | B2 | 4/2019 | Chinatalapalli Patta et al. |
| 10,983,512 | B2 * | 4/2021 | Morton ............ G05B 19/41895 |
| 2015/0107075 | A1 * | 4/2015 | Clarke .................. E02F 9/2833 29/703 |
| 2018/0011491 | A1 | 1/2018 | Morton et al. |
| 2020/0108496 | A1 | 4/2020 | Bidram et al. |
| 2023/0405799 | A1 | 12/2023 | Schauenburg et al. |

FOREIGN PATENT DOCUMENTS

| | | | | | |
|---|---|---|---|---|---|
| CN | 208533007 | U | * | 2/2019 | |
| CN | 109537203 | A | * | 3/2019 | ............. D05C 13/06 |
| CN | 109626130 | A | | 4/2019 | |
| CN | 110485006 | A | | 11/2019 | |
| CN | 110641576 | A | | 1/2020 | |
| CN | 210287638 | U | * | 4/2020 | |
| CN | 112248001 | A | | 1/2021 | |
| CN | 112405490 | B | * | 9/2025 | .............. B25J 11/00 |
| DE | 3524922 | C2 | | 1/1987 | |
| DE | 19654375 | A1 | | 6/1997 | |
| DE | 202011052251 | U1 | | 5/2013 | |
| DE | 102018131175 | A1 | | 6/2020 | |
| DE | 102019116207 | A1 | | 12/2020 | |
| EP | 0026471 | B1 | | 4/1981 | |
| EP | 0525448 | A1 | | 2/1993 | |
| EP | 3457241 | A1 | | 3/2019 | |
| FR | 2610235 | A1 | | 8/1988 | |
| JP | S5347276 | | | 4/1978 | |
| JP | H05106127 | A | * | 4/1993 | |
| JP | 4116206 | B2 | | 4/2001 | |
| JP | 2018-1397 | A | | 1/2018 | |
| WO | WO-2021019383 | A1 | * | 2/2021 | ........... B65G 1/1378 |

OTHER PUBLICATIONS

Translation CN 210287638.*

Translation CN 208533007.*

Translation CN 109537203.*

Translation CN 109355745.*

Translation CN 112405490.*

Search Report issued in corresponding Germany Application No. 10 2021 114 824.3, dated Nov. 29, 2021 (8 pages).

International Search Report for International Application No. PCT/EP2022/065030, dated Sep. 5, 2022.

* cited by examiner

TRANSPORT VEHICLE FOR A TEXTILE MILL

The present invention relates to a transport vehicle for a textile mill and to a textile material handling system in a textile mill having such a transport vehicle.

The transport vehicle can usually have a driving unit, which is designed to drive autonomously, i.e. without a driver, to a defined destination within a textile mill. The transport vehicle further has a carrying unit which is coupled to the driving unit in a stationary location, the carrying unit being configured to carry a unit to be transported, which can have a textile material loaded onto it and unloaded from it. For this purpose, the transport vehicle has a loading and unloading device with a loading and unloading arm having a conveyor unit for loading the textile material onto the unit to be transported and unloading the textile material from it.

A transport vehicle of this kind is disclosed, for example in the document CN 110641576 A. The transport vehicle is designed to transport wound and non-wound tube bodies without a driver, in which case a carrying surface is provided for receiving wound tube bodies or a pallet having package plates stacked in multiple layers, each having a plurality of wound tube bodies. In addition, the transport vehicle has a transport compartment below the carrying surface for storing non-wound tube bodies. However, loading and unloading of the wound tube bodies requires time-consuming intermediate steps to expose layers of further wound tube bodies covered with a package plate. Furthermore, the transport vehicle must be designed with a large surface area for transporting a large number of tube bodies in the horizontal plane. Moreover, the conveyor unit can require time-consuming attempts to reliably detect the tube body when the unsorted non-wound tube bodies are deposited in the transport compartment. Consequently, there is indeed potential for optimising the aforementioned transport vehicle in the handling of textile materials such as tube bodies within the textile mill.

In particular, the present invention is intended to provide a transport vehicle for a textile mill, by means of which handling of textile materials using the transport vehicle can be carried out in an improved manner. In particular, the present invention is intended to provide a transport vehicle by means of which a large number of tube bodies can be transported and/or a defined handling of the tube bodies can be carried out. Ultimately, the present invention is in particular intended to provide an alternative transport vehicle.

In any event, the transport vehicle according to the present invention has a conventional driving unit, which is designed to drive autonomously to a defined or predetermined destination within the textile mill. The embodiment of such a driving unit is sufficiently known from the prior art.

The transport vehicle according to the present invention further has a carrying unit, which is arranged on the driving unit in order to be moved by the latter through the textile mill. The carrying unit has an upper carrying surface facing away from the driving unit for carrying a unit to be transported, which can have a textile material loaded onto it and unloaded from it. Preferably, the carrying unit is arranged on the driving unit in a detachable manner. For the purposes of the present invention, detachable means a non-destructive, repeatable decoupling of the carrying unit from the driving unit and coupling of the carrying unit to the driving unit. In particular, the driving unit and the carrying unit are designed to be connectable to one another in a modular manner, so that the driving unit or the carrying unit are interchangeable. Alternatively, the driving unit can form a structural unit with the carrying unit, which is inseparable. However, such a structural unit has the advantage that a common interior space bounded by the driving unit and carrying unit can be provided, which offers a sufficiently large space for an arrangement and embodiment, in particular of the electronic and electrical components of the driving unit and further preferably of the carrying unit.

Furthermore, a loading and unloading device with a loading and unloading arm having a conveyor unit for loading the textile material onto the unit to be transported and unloading the textile material from it is provided. The loading and unloading device can preferably be detachable, and thus replaceable or fixed, i.e. non-detachable, to the carrying unit, further preferably to the upper carrying surface, and/or to the unit to be transported. Preferably, the loading and unloading device can be a conventional robot gripping device with a robot arm having a gripping unit designed as a conveyor unit, the robot arm having at least two arm sections connected to one another in an articulated manner, and the gripper unit being arranged at a free end of one of the arm sections. The gripper unit can preferably be at least two gripping tongs operatively connected to one another, a gripping rod with tensioning means, a robot hand, a gripper unit that can have vacuum applied to it for suction gripping of the textile material, or the like.

Further preferably, the loading and unloading device is a collaborative robot, also known as a cobot, with a robot arm and a robot hand, in particular designed as a conveyor unit, further preferably designed as a gripping unit. Such a cobot has the advantage that it can readily interact with an operator in the textile mill in a common environment without cages or guards, and without the safety precautions that would otherwise be employed, and can assist the operator in complex tasks that cannot be fully automated. In contrast to other robot devices, such cobots are equipped with sensor systems that cause the cobot to shut down if it comes into contact with defined obstacles. This can reliably prevent injuries to the operator.

The robot arm can preferably be assembled in a modular articulated manner. In this way, the robot arm can be lengthened or shortened by at least one additional arm section as required, in order to be able to adjust the reach as needed. The modular articulated composition can be achieved, for example, by means of ball-and-socket-type couplings which, in a further preferred manner, can have sliding contacts for passing information and/or the energy supply. Also, at least one arm section can preferably have a retractable and extendible subsection, thereby enabling simplified reach adjustment. In a further preferred manner, the conveyor unit can be interchangeably attached to the loading and unloading arm.

According to a preferred embodiment, the transport vehicle, in particular the loading and unloading device, has at least one image processing system, by means of which a defined ambient area of the transport vehicle and/or a defined working area of the loading and unloading device can be monitored optically, and further preferably monitored and recorded in a storable manner. Particularly preferably, the image processing system is arranged on the transport vehicle or on the loading and unloading device in such a way that the working area, i.e. a handling area of the loading and unloading device, in particular of the gripping unit, can be monitored or recorded. Preferably, the image processing system is located near or on the gripping unit outside it. Further preferably, the image capturing unit can be arranged on an arm section carrying the gripper unit or on a joint connecting this arm section and the gripper unit. An essential feature of the arrangement of the image processing system is the possibility of monitoring the working area of the gripper unit, in which case the image processing system is preferably arranged in such a way that an image capturing central axis of the image processing system is incongruent with a holding axis of the gripper unit. A holding axis of the gripper unit is understood to be the axis that runs between the gripping elements of the gripper unit and towards which the gripping elements move in order to grip an object or an item. In an object-free gripping state of the gripping unit, the gripping elements touch one another at or near the holding axis depending on their number and arrangement.

Furthermore, the image processing system is preferably communicatively connected to an operation control device of the loading and unloading device, in which case the operation control device is designed to control the loading and unloading device autonomously based on information from the image processing system. Preferably, a knowledge base can be provided, which is communicatively connected to the operation control device in such a way that the operation control device compares information of the image processing system with information stored in the knowledge base and controls the loading and unloading device in a defined manner based on this comparison. This is particularly advantageous for unsorted textile materials such as packages and tubes, which have to be handled in a defined manner by the loading and unloading device.

Furthermore, the image processing system, alone or in combination with the operation control device, is preferably designed to interact with markers positioned in a defined manner in the working area of the loading and unloading device. This means that the loading and unloading device can be controlled to perform precisely executable handling operations within the marking area defined by the markings. Incorrect movements can thus be avoided as far as possible, which increases productivity.

According to a preferred embodiment, the transport vehicle, in particular the loading and unloading device, has a linear guide for the loading and unloading arm, along which the loading and unloading arm can be moved in a linear manner. This means that the reach of the loading and unloading device can also be adjusted as required. Such a linear guide is advantageous in connection with an elongated unit to be transported. The linear guide can preferably extend obliquely or parallel to the carrying surface. In particular, the linear guide extends vertically to the carrying surface, in which case a unit to be transported, which extends in a mainly vertical direction, can be arranged on the carrying surface in order to be able to keep the horizontal dimension of the transport vehicle as small as possible in terms of its width and depth, so that it can also drive through narrow passages, for example between two adjacent textile machines. Further preferably, the linear guide can be a straight-line guide, a curved guide, or a combination of a straight-line and curved guide. Such a linear guide also favours the use of a loading and unloading arm that is configured with a shorter length and, in general, a reduction in the weight of the transport vehicle.

The transport vehicle according to the present invention is characterised in that the unit to be transported is formed by a package buffer fixed on the upper carrying surface, in particular in a non-destructively detachable manner, with a plurality of storage points each for storing a wound or non-wound tube body. The storage point can preferably be formed by a receiving compartment, into which at least one tube body can be inserted, and/or a receiving arbour, onto which at least one tube body can be slipped or placed, in particular in a manner that can be clamped. In a preferred manner, the receiving compartment and/or the receiving arbour extends at an angle through a horizontal plane crossing the storage point, with at least one opening section of the receiving opening of the receiving compartment or the receiving tip of the receiving arbour is arranged above an upper side of the horizontal plane facing away from the carrying unit. As a result, the tube body can be reliably stored in the storage point via the receiving opening or receiving tip without the risk of falling out while the transport vehicle is moving. Furthermore, holding means such as clamping means for holding or clamping the tube body can be dispensed with, since the tube body can be held in the receiving compartment or on the receiving arbour by its own weight alone. In this context, an arbour is to be understood as any element or means that can be engaged in the tube body and onto which the tube body can be slipped or placed. For example, the arbour can be formed by a pin, bar, or similar projecting element that can engage in a receiving opening of the tube body.

Further preferably, the package buffer and the loading and unloading device are arranged and designed in such a way that the conveyor unit can directly access each tube body stored in a storage point of the package buffer. This can reliably ensure that each tube body can be reached by the conveyor unit without the need to remove another tube body. This can increase the degree of freedom in loading and unloading the transport vehicle with respect to selected tube bodies, such as tube bodies of different lots, with different handling procedures or different tube body configurations.

According to a preferred embodiment, at least one storage point of the plurality of storage points is configured to store at least two tube bodies in series along the tube body length. The number of tube bodies to be stored can be increased in an improved manner with reduced installation space.

According to a preferred embodiment, the package buffer is formed with at least two storage segment units, each of which has at least one storage point, with the storage segment units, of which there are at least two, and the loading and unloading device being adapted to rotate relative to one another. For example, the storage segment units and/or the loading and unloading device can be provided in a rotatable manner. In the preferred embodiment of the rotatable storage segment units, the rotational mobility can be provided on the point about a common central axis of rotation of the storage segment units to save installation space, whereas in the case of the loading and unloading device being able to rotate, a guide extending at least partially or completely rotationally about the storage segment units can be provided in order to be able to serve all storage points of the storage segment units, of which there are at least two. Further preferably, the package buffer can be rotatable, in which case the storage segment units can further preferably be arranged on and fastened to the package buffer in a stationary or alternatively movable manner. The rotational mobility of the package buffer, the storage segment units and/or the loading and unloading device can preferably be implemented actively or passively. In the case of active rotational mobility, a motor is provided which causes the rotation directly. In the case of passive rotational mobility, rotation is initialised by an angular momentum applied externally to the package buffer, the storage segment unit or the loading and unloading device. For example, the package buffer or storage segment unit can be equipped with a latching device that releasably latches them in predetermined positions, the latching being releasable by the angular momentum. Preferably, the angular momentum can be initiated by the loading and unloading device by applying the angular momentum to a predetermined surface, line or point. The relative rotational mobility favours a space-reduced storage of tube bodies in the horizontal direction, since it is possible to switch to a vertical direction without further ado.

In a preferred manner, the storage segment units, of which there are at least two, are formed by a frame structure projecting vertically from the upper carrying surface, which frame structure has on at least two of its vertical sides extending vertically to the upper carrying surface in each case a plurality of storage points extending in the horizontal and/or vertical direction, the frame structure being arranged and set up on the upper carrying surface so as to be able to rotate relative to the loading and unloading device. For example, the frame structure can be formed by an approximately rectangular frame, which has a plurality of storage points on its two sides facing away from one another. Alternatively, the frame structure can preferably be configured as a cuboid frame with, in particular, internal storage points which can be loaded and unloaded in a defined manner from an associated side surface of the cuboid frame structure. Thus, in the preferred embodiment with internal storage points, the frame structure can, for example, enclose storage points which are assigned in a defined manner to side surfaces of the cuboid frame structure facing away from and/or adjacent to one another, in order to be able to be served or loaded and unloaded by the loading and unloading device via these corresponding side surfaces in each case.

Preferably, the frame structure can be mounted on a plate-like turning device, which is arranged on the upper carrying surface or integrated in the carrying unit and is designed to rotate the frame structure about a central axis of rotation of the plate-like turning device, in particular one extending vertically through the centre of the plate. Further preferably, the turning device can be designed to move linearly in the horizontal direction and/or in the vertical direction on the upper carrying surface.

Alternatively or in addition thereto, according to a preferred embodiment, the carrying unit can be arranged on the driving unit so as to be linearly movable in the horizontal direction and/or in the vertical direction of the transport vehicle. Even if the mobility is naturally limited by the dimensions of the transport vehicle, the mobility favours reliable handling, such as loading and unloading of all storage points or tube bodies of the package buffer, and grants a high flexibility and variability in the design of both the package buffer and the loading and unloading device.

According to a preferred embodiment, the package buffer is configured as a storage paternoster, the storage segment units, of which there are at least two, each forming a shelf of the storage paternoster which can be moved circumferentially at a distance from the carrying surface. For the purposes of the present invention, a shelf is to be understood as any carrier which is suitable for carrying at least one storage point for receiving a non-wound or wound tube body. For example, the shelf can be configured as a kind of cross brace or in a board-like manner. The storage paternoster is characterised by the fact that it constitutes a compact circulating storage system.

Further preferably, the package buffer has a plurality of shelves to store a sufficient quantity of tube bodies. The number of storage segment units or shelves as well as the storage points to be provided per shelf depend on the dimensioning of the package buffer and can be provided according to the embodiment of the package buffer. It has been found to be advantageous that a maximum of four, and preferably only two, storage points are configured per shelf in order to keep the horizontal extent of the package buffer as small as possible while maintaining a sufficient storage quantity. In an advantageous manner, the embodiment as a storage paternoster allows an efficient utilisation of an existing spatial height with a relatively small footprint.

The storage paternoster is preferably configured to be accessible to the loading and unloading device from at least one defined side, whereas selected other sides can further preferably be covered by means of a wall. As a result, the tube bodies to be transported can be protected from external influences and falling down in an improved manner after the corresponding storage point has been loaded.

According to a preferred embodiment, the package buffer, in particular the storage paternoster, is configured as a housing which has, in the housing interior, the storage points enclosed by housing walls, the housing having at least one, in particular closable, opening on one of the housing walls, via which the loading and unloading device can carry out the loading and unloading of the package buffer. In a further preferred embodiment, a mouth leading into the housing interior is preferably provided for generating a defined positive pressure or a suction flow in the housing, in which case the mouth is or can be coupled to a source, in particular to a blower, for generating the overpressure or the suction flow. This allows a defined positive pressure to be introduced into the housing to prevent fibre fly and similar airborne dirt particles from entering the storage space of the package buffer formed by the housing interior. When a suction flow is applied, the fibre residues and similar dirt particles that have penetrated the storage space can be discharged from the storage space. In order to prevent further fibre residues or dirt particles from entering the storage space via the opening in the case of suction flow, the opening can preferably be closed with an air-permeable filter which cleans out the fibre residues or dirt particles from the ambient air drawn into the housing interior. The filter can further preferably be in an active connection with a cleaning nozzle, which is arranged, in particular on the package buffer, and designed to blow compressed air onto the filter surface to remove the accumulated fibre residues and dirt particles in order to prevent clogging of the filter. The blowing of the filter can preferably be carried out or initiated as required at predetermined times or in intervals.

According to a preferred embodiment, the storage points can be arranged in any selected manner. Thus, any selection of storage points adjacent to one another in the horizontal and/or vertical direction of the package buffer can be arranged in a straight line adjacent to one another or offset from one another. The straight-line arrangement favours easier and thus more reliable loading and unloading of the package buffer or the individual storage points. The staggered arrangement is preferred when a more compact embodiment of the package buffer is desired. For example, an offset arrangement can be configured in such a way that four storage points adjacent to one another form a parallelogram or a rhombus in a plan view, or are arranged in the corresponding corner points of such a shape. Preferably, the storage points can be arranged in the package buffer in such a way that a storage point of an arrangement row is arranged centrally with respect to two immediately adjacent storage points of a parallel arrangement row adjacent thereto on a projection line between these two storage points. In a plan view of these three storage points, such an arrangement results in an isosceles triangle. In other words, the three storage points are arranged at the vertices of an isosceles triangle.

Preferably, one arrangement row of storage points can also be arranged offset from an adjacent parallel row of storage points along an orthogonal line extending at right angles to a plan view plane of the two rows of storage points. Preferably, at least the arrangement row that is lower in the plan view or both arrangement rows can be configured so that they can be moved back and forth along the orthogonal line. In this way, in particular, an arrangement row of storage points to be loaded or unloaded can be brought to the foreground so that it is visible to an operator or can be easily detected by sensor systems, in order to assist with more reliable loading and unloading, and at the same time to make this easy for an operator to visualize or detect. Such a sensor system can, for example, be arranged on the package buffer, the loading and unloading device or on a device external to the transport vehicle, such as a textile machine or a magazine or buffer for tube bodies. The sensor system can be coupled to a control unit and/or evaluation device, as described in more detail below.

According to a further aspect of the present invention, the unit to be transported can be formed alternatively or in addition to the configuration as a package buffer by a tube handling unit fixedly arranged on the carrying unit, preferably on the upper carrying surface, further preferably in a non-destructively detachable manner, for autonomously handling the tube body, in particular the non-wound tube body, the wound tube body and/or a thread wound onto the wound tube body. For the purposes of the present invention, autonomous means such an activity which is performed by an apparatus, device or unit of the transport vehicle without the intervention of an operator. A tube handling unit is understood to be such a unit, which (i) handles the wound tube body in such a way that at least one characteristic attributable to the wound tube body, for example
  - the thread property such as in particular, but not exhaustively enumerated, thread structure, thread strength, hairiness, elongation, twist, moisture or the like,
  - the thread dimension such as, in particular, the thread cross section or the thread diameter,
  - the wound thread length,
  - the cross section of the wound tube body, or
  - the diameter of the wound tube body or (ii) otherwise influences the non-wound or wound tube body in a defined manner, for example by the application or insertion of a label, a readable, in particular electronically storable code, a sheathing or the like.

This means that a defined tube or thread handling can be shifted from a textile machine to the transport vehicle, thus improving the productivity of the textile machine. For example, the otherwise unused transport time can be effectively utilised for the defined handling of the tube body or the thread.

Preferably, the tube handling unit has a thread catching unit for catching a thread end from a package surface of a wound tube body, in particular received in the storage point. The thread catching unit can be designed in the usual way, as known for example from spinning and winding machines. Further preferably, the storage point can be designed to unidirectionally or bidirectionally rotate the tube body about its longitudinal axis. For example, the storage point can have an individual drive for rotating the tube body in only one direction or reversibly about its longitudinal axis. As a result, the thread catching process of a thread end can be assisted in an improved manner. The thread end can be a beginning of the thread or an end of the thread of the thread wound on the tube body. The beginning of the thread is the thread end which is applied to the tube body before the actual winding process. The end of the thread is the other thread end, which is deposited on the tube body after the winding process is completed. The thread catching unit on the transport vehicle enables the transfer of the components for carrying out the handling of a thread wound onto the tube body from the textile machine to the transport vehicle.

Furthermore, the tube handling unit preferably has a thread severing unit for severing a thread section of a thread caught by a thread catching unit, in particular the thread catching unit of the textile machine and/or the transport vehicle, which is unwound from the wound tube body. The thread severing unit can be a common cutting device or laser device for severing a thread. This enables a clean thread end to be provided for subsequent processes.

According to a further preferred embodiment, the thread catching unit is configured to be movable relative to the storage point and the thread severing unit, which is in particular of a stationary configuration, for severing the thread stretched between the wound tube body and the thread catching unit in the course of the relative movement. This enables a structurally simple embodiment of the thread severing unit, for example by a mere cutting blade, which is arranged stationary in such a way that a thread section of the thread caught by the thread catching unit can be moved towards the cutting blade for severing in the course of the relative movement and can be guided over the cutting blade. Alternatively or additionally, the thread severing unit can be provided as a movable unit to cut the caught thread at a defined location.

Preferably, the tube handling unit can also have a clamping device by means of which a thread caught by the thread catching unit can be clamped. The clamping device is further preferably arranged close to the mouth of the thread catching unit, in particular so that it can be moved along with it. This allows a reliable thread separation process to be carried out.

The tube handling unit having the thread catching unit and the thread severing unit as well as further preferably the clamping device preferably forms a thread search and cut-to-length unit by means of which a defined cutting to length of a thread wound onto a tube body is made possible independently of the textile machine, which can be advantageous for subsequent handling processes of the wound thread. The thread search and cut-to-length unit has proven to be particularly efficient in combination with the rotational mobility of the tube body in the storage point as described above, which enables the thread end to be reliably located and caught.

According to a further preferred embodiment, the transport vehicle has a weighing unit by means of which at least the weight of the package buffer or the weight of at least one tube body to be loaded or unloaded can be recorded for evaluation and/or display. The weighing unit can further preferably be integrated into the driving or carrying unit or arranged on the carrying surface between the carrying unit and the package buffer. Alternatively or additionally, the loading and unloading device can have a weighing unit or units, in which case the weight of a tube body to be conveyed by the conveyor unit can be detected by the weighing unit. The detection of the weight of a tube body, in particular one that has been wound, can thus be easily and reliably recorded and displayed and/or evaluated, in particular with regard to the productivity of a workstation, a section and/or the textile machine.

According to a preferred embodiment, the transport vehicle has one or more operation control devices for controlling at least one of the controllable units of the transport vehicle, such as, in particular, the driving unit, the unit to be transported, the loading and unloading device and the further units described above, as well as the drive. Alternatively or additionally, at least one of the operation control devices can be an external operation control device and the unit to be controlled is configured so that it can be wirelessly coupled to the external operation control device. Such an external operation control device proves to be advantageous especially with regard to a central controller for controlling several identical controllable units and/or transport vehicles. Furthermore, an operator or a higher-level controller can intervene (manually in the case of an operator) in a defined manner in an operating process of a controllable unit.

According to a preferred embodiment, the transport vehicle has at least one operation control device for controlling the driving unit and an operation control device for controlling the loading and unloading device, with these two operation control devices being further preferably communicatively connected to one another. The arrangement of the operation control devices for the driving unit and for the loading and unloading device on the transport vehicle can be carried out as required and favours the fully autonomous functionality of the transport vehicle. It can automatically drive to defined positions within the textile mill, for example via the operation control device for the driving unit, in which case the defined position can be specified externally to the transport vehicle. Once the defined position has been reached, the loading and unloading device can preferably start handling immediately using the information about reaching the defined position from the operation control device of the driving unit or, alternatively or additionally, using data recorded by sensor systems arranged on the transport vehicle or at the destination to confirm that the defined position has been reached.

Furthermore, the transport vehicle preferably has one or more evaluation devices for evaluating at least one associated unit of the transport vehicle, which is designed to record and transmit information, such as in particular the driving unit, the unit to be transported, the loading and unloading device and the further units described above, as well as the drive. Alternatively or additionally, at least one of the evaluation devices can be an external evaluation device and the unit to be controlled or the drive is configured so that it can be wirelessly coupled to the external evaluation device. Such an external evaluation device proves to be advantageous especially with regard to a central evaluation for evaluating several identical units, drives and/or transport vehicles. Further preferably, at least one evaluation device can be formed by an operation control device.

Furthermore, according to a preferred embodiment, the transport vehicle can have an indicating unit for displaying operating and/or evaluation information of at least one unit or drive of the transport vehicle, which can be arranged externally or enclosed by the transport vehicle equivalent to the operation control device or evaluation device. In particular, an external indicating unit, especially an additional one, proves to be advantageous, in which case such an external display unit can be formed, for example, by a hand-held device such as a smartphone, tablet, notebook, smartwatch or the like. Thus, an operator can access or query corresponding operating and/or evaluation information of at least one unit or drive of the transport vehicle at any time, regardless of his/her location.

Preferably, the transport vehicle is configured to supply at least one of its units and drives requiring operating energy or an operating medium, such as in particular the unit to be transported, the rotary drive and/or the loading and unloading device, at least autonomously, with the operating energy and/or the operating medium, in addition to the driving unit or via an interface. The autonomous supply can be enabled, for example, by an operating energy source such as a rechargeable battery arranged on the transport vehicle or an operating medium supply source such as a blower arranged on the transport vehicle. The autonomous operating energy source can be used to supply energy to both the driving unit and the unit requiring the operating energy, or it can be an additional battery to the power source supplying power to the driving unit. In the case of supply via an interface, the operating energy or operating medium is supplied to the corresponding unit or drive from a source external to the transport vehicle via the interface. For example, the interface can be designed as a connection point for connection to a corresponding mating connection point on the textile machine. Thus, the operating energy available at the textile machine or the operating medium available at the textile machine, such as compressed or suction air, can be used for the unit of the transport vehicle, in which case the weight of the transport vehicle can be optimised.

The transport vehicle can further preferably have at least one protection unit for protecting a driving component of the driving unit from dirt lying around on the roadway of the transport vehicle in at least one direction of travel of the transport vehicle. This can reduce the risk of a possible impairment to travel and increase the service life of the driving component.

Preferably, the transport vehicle can have a retractable and extendible support beam for supporting the transport vehicle when stationary. Such a support beam increases the footprint of the transport vehicle, which can ensure sufficient stability. Preferably, the transport vehicle has at least two support beams which, arranged in particular on opposite sides of the transport vehicle, provide secure support for the transport vehicle.

According to another aspect of the present invention, there is provision of a textile material handling system, in particular wound and/or non-wound tube bodies, in a textile mill, having one or more transport vehicles as described above according to a preferred embodiment, and a control system by means of which the transport vehicle is controlled to drive to defined locations within the textile mill. This allows the textile material to be handled on or off the textile machine within the textile mill as required.

The control system can preferably be communicatively connected to the operation control device for controlling the driving unit, and be designed to transmit target position information to the operation control device, based on which the transport vehicle automatically drives to the target position by means of the operation control device of the driving unit.

Further preferably, the system is configured as a system for distributing textile material in a textile mill. The system has a textile material removal station, a textile material receiving station, and a transport vehicle as described above according to a preferred embodiment for moving the textile material from the textile material removal station to the textile material receiving station. Thereby, at least the control system and the transport vehicle, and further preferably the textile material removal station and/or the textile material receiving station, are connected to one another, in particular wirelessly, for exchanging distribution information regarding the textile material removal at the textile material removal station and the textile material delivery to the textile material receiving station.

The distribution information can be, for example, destination position information with respect to the textile material removal station or the textile material receiving station. Based on this target position information, the transport vehicle moves automatically to the specified position. At the specified position, for example, it is determined by means of a/the image processing system as described above which handling operations are to be carried out at the specified position, in particular whether textile material is to be removed or deposited. The removal or depositing of the textile material can preferably be carried out automatically by the transport vehicle or the loading and unloading device by means of an appropriate sensor system. Alternatively, a specification can be made by means of the distribution information. For example, the distribution information can have at least information about a number and a storage location of the textile material to be removed or deposited.

The textile material removal station and the textile material receiving station are stations from which textile material, such as in particular non-wound or wound tube bodies, can be removed from the transport vehicle or to which the textile material can be deposited from the transport vehicle. Thus, in the case of a planned loading of textile machines, the transport vehicle can pick up tube bodies, i.e. non-wound and/or wound tube bodies, from a tube magazine set up away from the textile machine in the textile mill and transport them to the textile machine in order to supply it with the textile material. In this preferred embodiment, the tube magazine constitutes the textile material removal station, while the textile machine is the textile material receiving station. However, tube bodies can also be picked up from the textile machine by the transport vehicle and transported to a defined location in the textile mill. Such a location can be, for example, another textile machine, an intermediate tube body store, a handling device for handling wound tube bodies, such as a heat set creel, or a removal transport store where finished wound tube bodies are stored for removal from the textile mill. In this case, the textile machine corresponds to the textile material removal station, while the machine, device or store to which the textile material is transported by the transport vehicle forms the textile material receiving station.

Preferably, the transport vehicle is designed to handle non-wound and/or wound tube bodies for twisting and/or cabling machines, to transport them and/or to load or unload a or the package buffer, the textile material removal station or textile material receiving station. Wound tube bodies form a plied yarn or cabling package in particular. Non-wound tube bodies are those which are preferably suitable for forming a plied yarn or cabling package. Plied yarn and cabling packages have a higher weight as well as larger dimensions compared to take-up packages produced by spinning and winding machines, which is why the use of such a transport vehicle in the textile mill proves to be particularly advantageous for the plied yarn and cabling area as a means of increasing productivity and process flows.

The tube bodies are preferably a hollow body partially formed at least on one end face, in order to ensure appropriate reception in the storage point or by the conveyor unit via the hollow body-like embodiment. Further preferably, the tube body is hollow-bodied at both end faces. Particularly preferably, the tube body is formed by a hollow cylinder. Preferably, the tube body can be formed of a plastic or cellulosic material or a combination of these materials. Other types of material can also be used to form the tube body, provided that such a material proves to be suitable.

Embodiment examples of the present invention are explained below with reference to the drawings. In the drawings:

FIG. 1 shows a perspective schematic side view of a transport vehicle according to a first embodiment example, FIG. 2 shows a perspective schematic side view of a transport vehicle according to a second embodiment example, FIG. 3 shows a perspective schematic side view of a transport vehicle according to a third embodiment example, FIG. 4 shows a perspective schematic side view of a transport vehicle according to a fourth embodiment example, FIG. 5 shows a perspective schematic side view of a transport vehicle according to a fifth embodiment example;

Figure 1:
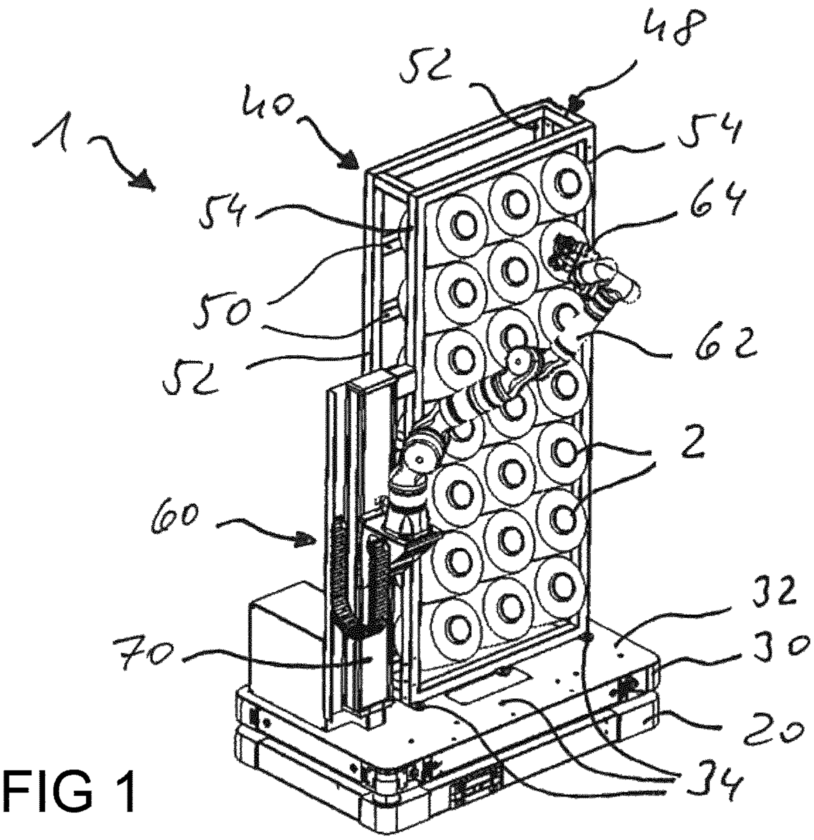
FIGS. 1 to 5 show different embodiments of a transport vehicle 1 in a purely schematic view, in which case identical reference signs are used for components, units, devices or equipment acting in the same way.

FIGS. 1 to 5 each show a perspective schematic side view of a transport vehicle 1, each with a package buffer 40 configured as a unit to be transported, in different embodiments. The transport vehicle 1 has a driving unit 20, which is designed to drive autonomously to a defined destination within a textile mill. For this purpose, the driving unit 20 according to this embodiment example is equipped in the usual manner with corresponding rollers, sensor systems, drives and a control unit, which enable the transport vehicle 1 to be moved in a defined manner.

According to one embodiment example, a carrying unit 30 is detachably arranged on the driving unit 20. The carrying unit 30 can thus be exchanged for another carrying unit 30 in an uncomplicated and rapid manner. Also, the carrying unit 30 can be combined with another driving unit 20.

According to a further embodiment example, the driving unit 20 and the carrying unit 30 form a non-disconnectable or inseparable structural unit with a common interior space in which electronic and electrical components as well as the chassis of the transport vehicle 1 are accommodated.

The carrying unit 30 has, on a side facing away from the driving unit 20, an upper carrying surface 32 for carrying a unit to be transported. The upper carrying surface 32 has a plurality of attachment points 34, by means of which one or more units to be transported can be arranged and fixed. In the embodiment examples according to FIGS. 1 to 5, the unit to be transported is in each case a package buffer 40, which is detachably fixed on the upper carrying surface 32 in order to be able to be removed or mounted in an uncomplicated and rapid manner. According to a further embodiment example, the package buffer 40 is fixedly, i.e. non-detachably, attached to the upper carrying surface 32.

Also arranged on the upper carrying surface 32 is a detachable loading and unloading device 60, which can be moved along a linear guide 70 vertically relative to the upper carrying surface 32. The linear guide 70 is also detachably mounted on the upper carrying surface 32. According to this embodiment example, the linear guide 70 and the loading and unloading device 60 are connected to an operating energy supply source via plug connections. The loading and unloading device 60 has a multi-articulated loading and unloading arm 62 with a conveyor unit 64 pivotally and rotatably mounted on a free end of an outer arm portion of the loading and unloading arm 62. The loading and unloading arm 62 with the conveyor unit 64 is thus freely movable in space in order to be able to reach any point in space along the reach of the loading and unloading arm 62, in particular any storage point 42 of the package buffer 40. According to a further embodiment example, the loading and unloading device 60 is configured as a collaborative robot, a so-called cobot, which has sensor systems for automatically shutting down the robot in order to be able to interact with an operator of the textile mill and avoid injuries to the operator. According to a further embodiment example, the cobot is preferably configured to be reactivated by an operator or a control device after an automatic shutdown. Preferably, predefinable conditions can be acknowledged or confirmed, in particular automatically, for the activation.

The package buffer 40 according to the first embodiment example shown in FIG. 1 has a cuboid frame structure 48 extending primarily vertically from the upper carrying surface 32. On a rear side, the frame structure 48 has a plurality of cross braces 50 extending horizontally between two vertical rear frame elements 52, each of which carries a plurality of storage points 42 arranged side by side. The first embodiment example shown is a purely exemplary example of seven cross braces 50, each with three storage points 42 arranged next to one another, each of which is designed to accommodate a non-wound and wound tube body 2. The frame structure 48 can very well be formed with a different number of cross braces 50 and storage points 42 as required.

The storage points 42 are designed to receive the tube bodies 2 at a slight angle to a horizontal plane in order to protect them from accidentally falling out. For this purpose, the storage points 42, which are formed as arbours according to this first embodiment example, extend obliquely upwards from the respective cross brace 50 to the horizontal plane crossing the respective cross brace 50. This allows the tube body 2 to be reliably held on the arbour by its weight alone.

According to a further embodiment example, the arbour is designed to clamp the tube body 2. For this purpose, the respective arbour has a clamping device on its outer circumferential surface, which is mounted by the elastic effect of a spring.

The frame structure 48 is configured such that a direct distance between a vertical front frame element 54 and the associated opposing rear frame element 52 is shorter than a length of the tube body 2 to be received by the storage point 42. This allows the front frame elements 54 to form a lateral support for the received wound tube bodies 2. Furthermore, the respective storage points 42 or tube bodies 2 can be handled or loaded and unloaded by the loading and unloading device 60 without the risk of obstruction by the front frame elements 54. In this case, the loading and unloading device 60 with the linear guide 70 are arranged on a narrow side of the frame structure 48 on the carrying unit 30. This allows the conveyor unit 64 to load and unload the package buffer 40 easily and reliably from the front.

Figure 2:
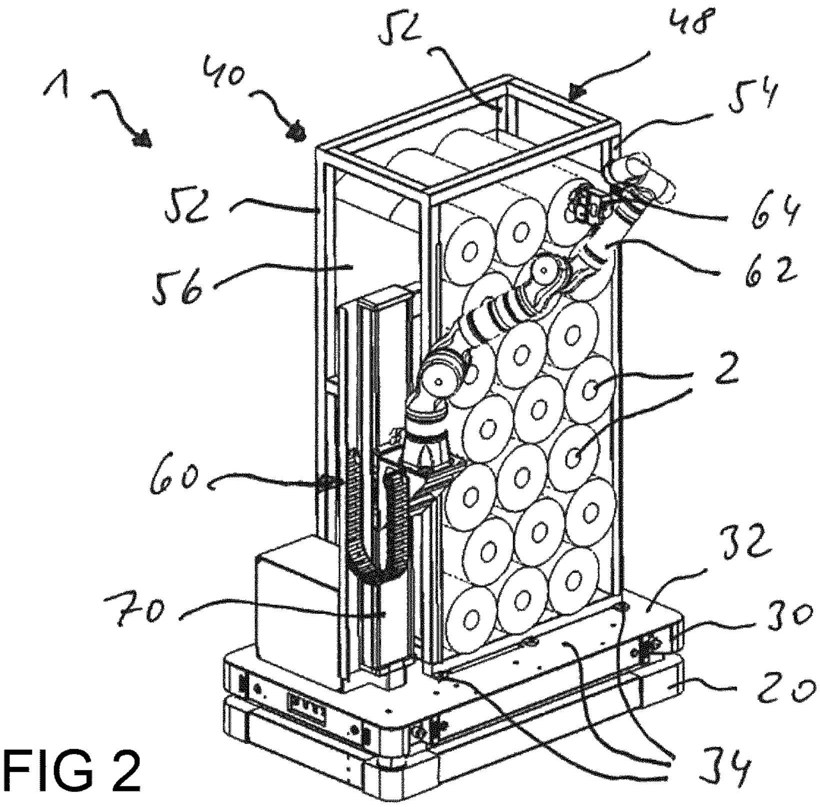

The frame structure 48 of the package buffer 40 according to the second embodiment example shown in FIG. 2 differs from the first embodiment example described above in the distance between the respective rear and front frame elements 52, 54, which according to this second embodiment example is greater than one tube body length and less than two tube body lengths. According to a further embodiment example, the distance is equal to or greater than two tube body lengths. This favours protection of the tube body end faces during transport travel.

The storage points 42 are further configured to receive and store two hollow-cylindrical tube bodies 2 in series along a longitudinal axis of the tube body 2. Furthermore, a vertical side wall 56 is arranged on each of the narrow sides of the frame structure 48 for protecting the accommodated tube bodies 2. Moreover, adjacent storage points 42 are offset from one another in the vertical direction of the package buffer 40. In particular, the horizontal distance between a storage point 42 and a storage point 42 adjacent below or above it in the vertical direction is one-half the distance between two of the storage points 42 arranged immediately adjacent below or above it in a horizontal plane. The staggered arrangement allows a more compact arrangement of the tube bodies 2 in the vertical direction of the package buffer 40.

Furthermore, the storage points 42 are horizontally oriented so that tube bodies 2 accommodated in the storage points 42 are stored with their longitudinal axis horizontal. In this second embodiment example, the storage points 42 are provided with holding or clamping means which hold or clamp the tube bodies 2 in the horizontal position.

Figure 3:
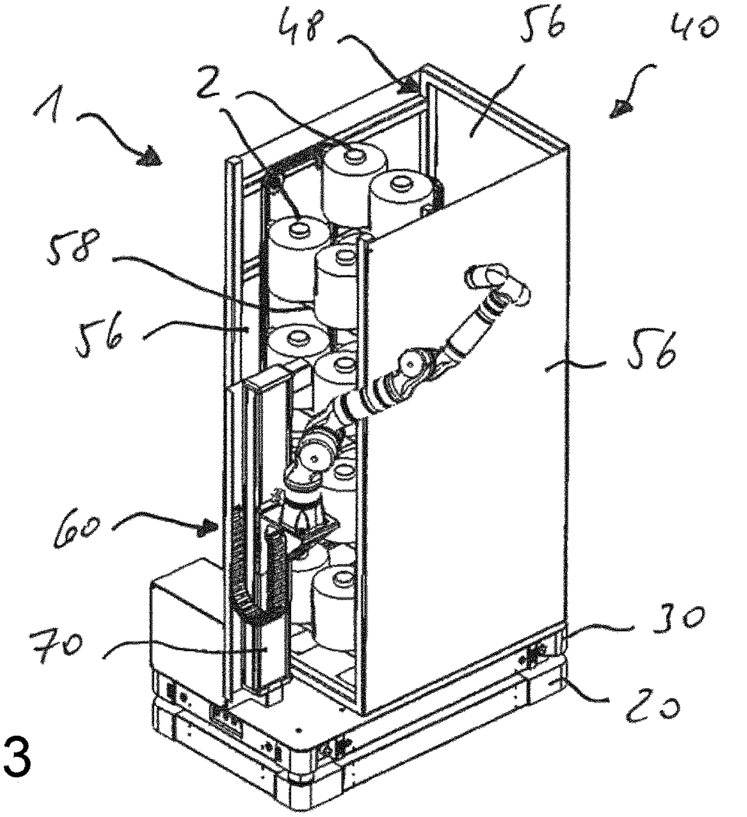

FIG. 3 shows a transport vehicle 1 according to a third embodiment example. The third embodiment example differs from the first and second embodiment examples in the embodiment of the package buffer 40 configured as a unit to be transported. According to this third embodiment example, the package buffer 40 is configured as a storage paternoster. For this purpose, a frame structure 48 is arranged on the carrying unit 30, which is provided with side walls 56 on at least three sides, which walls define a storage space within the frame structure 48, in which the storage points 42 are arranged on corresponding shelves 58 mainly in a vertical circumferential direction. The package buffer 40 is accessible from one side and the top adjacent thereto for the loading and unloading device 60 to load and unload the storage paternoster. In this third embodiment example, the shelf 58 is configured as a horizontal cross brace, from the upper side of which two vertical arbours project in each case for the respective, in particular clamping, accommodation of a tube body 2. According to a further embodiment example not shown, the shelf 58 can have a board-like surface on which the tube bodies 2 can be placed and stored. To ensure stability of the set-up tube body 2, the shelf 58 can have a recess corresponding to the cross section of the tube body 2, into which an end face of the tube body 2 can engage, or can also have an arbour projecting into the cavity of the tube body 2. Alternatively or additionally, at least one duct can be provided on the shelf 58, into which the tube body 2 can be inserted and removed from above.

Figure 4:
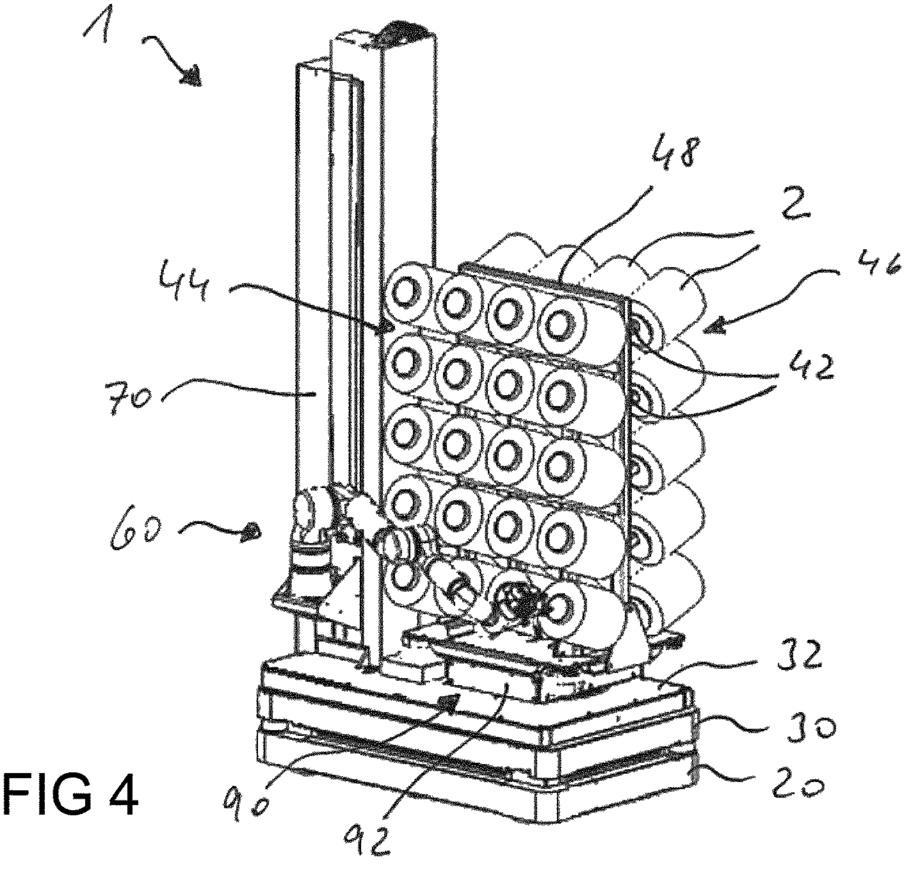

FIG. 4 shows a fourth embodiment example of a transport vehicle 1. The fourth embodiment example differs from the first to third embodiment examples in that the package buffer 40 is configured as a unit to be transported. The frame structure 48 of the package buffer 40 according to this fourth embodiment example has first and second storage segment units 44, 46, each having a plurality of storage points 42; according to this fourth embodiment example, there is a total of 20 storage points divided into five rows arranged one above the other, each having four storage points 42 arranged side by side. The number of storage points 42 per first and second storage segment units 44, 46 can be selected as needed. The frame structure 48 has a rectangular frame for forming the first and second storage segment units 44, 46, with the rectangular frame having a plurality of horizontally extending cross braces 50 having a plurality of arbours on opposite sides of the rectangular frame for respectively forming a storage point 42. As described for the first embodiment example, the arbours are oriented obliquely upwards starting from the associated cross brace 50 for safe mounting and removal of a tube body 2. The first storage segment unit 44 is formed by one side of the rectangular frame of the frame structure 48, and the second storage segment unit 46 is formed by the side of the rectangular frame opposite thereto. According to a further embodiment example not shown, a third and in particular a fourth storage segment unit can be provided in that the frame structure forms a cuboid frame having, for example, four sides on which corresponding cross braces 50 with arbours are provided. Each side, which is configured to store a tube body 2, thus forms a corresponding storage segment unit.

The package buffer 40 according to this fourth embodiment example is provided to be rotatable. For this purpose, a turning device 90 is provided between the package buffer 40 and the carrying unit 30. The turning device 90 has a rotary plate 92 on which the package buffer 40 is rotatable about a vertical central axis of the rotary plate 92. Thus, in a simple manner, each storage segment unit 44, 46 can be made accessible to the loading and unloading device 60 for loading and unloading the package buffer 40.

Figure 5:
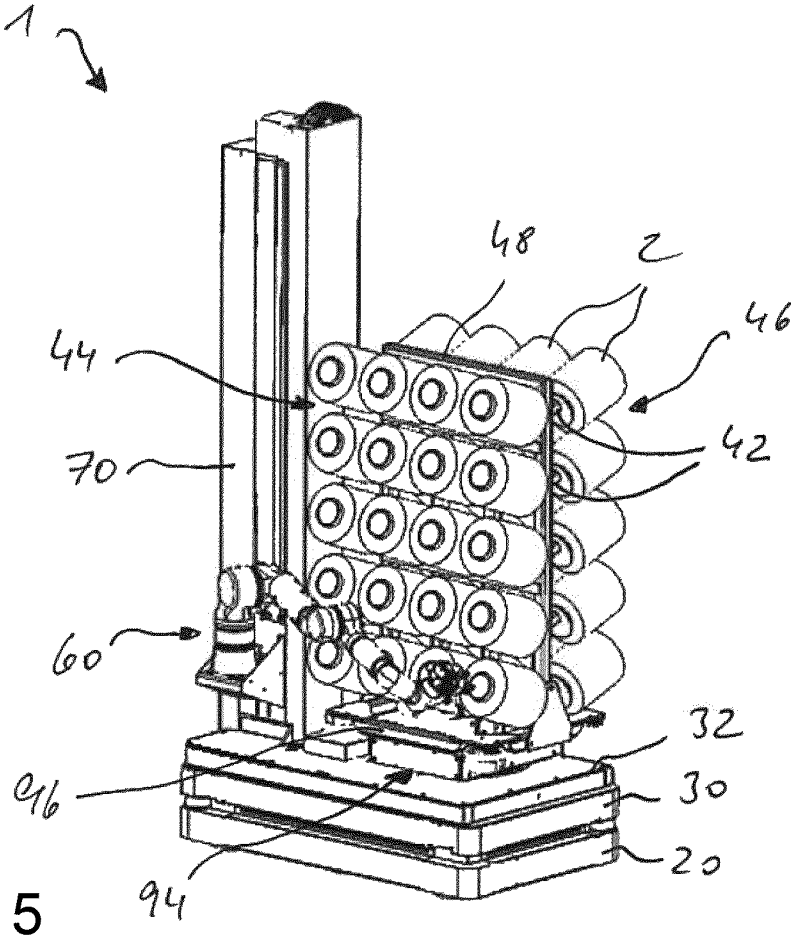

FIG. 5 shows a transport vehicle 1 according to a fifth embodiment example, which, in contrast to the transport vehicle 1 according to the fourth embodiment example, is supplemented by a weighing unit 94 for detecting a weight of the package buffer 40. In this fifth embodiment example, the turning device is implemented by a non-visible shaft which protrudes centrally through the weighing unit 94 and engages below a carrying plate 96 for the package buffer 40. The shaft is coupled to a lifting and lowering device which is received by the carrying unit 30 and is adapted to lift and lower the package buffer 40 vertically via the shaft to correspondingly lift and rotate the package buffer 40 and to place it on the weighing unit 94. By means of the weighing unit 94, the weight of the package buffer 40 can thus be used to draw a conclusion about the weight of one, several or all of the loaded or unloaded tube bodies 2. The recorded and/or determined weight can be displayed via a display device. The display device can be provided on the transport vehicle 1, the textile machine or externally thereof, in which case the weighing unit 94 can be coupled to the display device directly or via an evaluation device.

Figure 6:
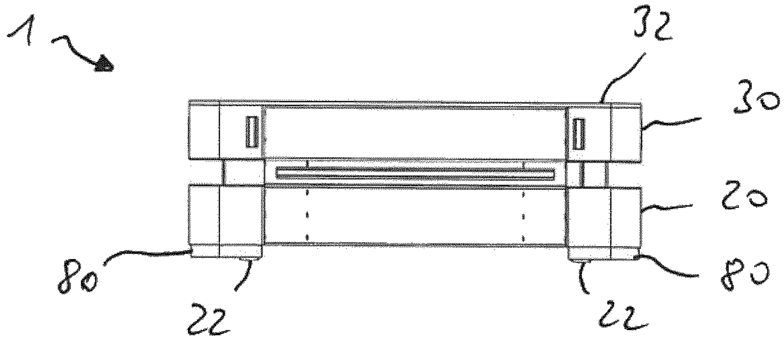
FIG. 6 shows a schematic front view of a transport vehicle according to a sixth embodiment example.

A transport vehicle 1 according to a sixth embodiment example without a unit to be transported is shown in FIG. 6. In contrast to the embodiment examples described above, the transport vehicle 1 has a protection unit 80 in the form of a deflector for protecting a driving component 22 from dirt lying around on the roadway of the transport vehicle 1 in at least one direction of travel of the transport vehicle 1 of the driving unit 20, which in this sixth embodiment example is configured as a roller. The protection unit 80 protrudes from an underside of the driving unit 20 that is close to the roadway by a length that is at most equal to the distance between the roadway contact surface of the driving component 22 and the underside of the driving unit 20. Preferably, an end portion of the protection unit 80 can be formed by a flexible component such as a plurality of bristles extending in the direction of the roadway to provide a brushing effect. If that the end portion does not have a flexible component, the projecting length of the protection unit 80 is selected to be shorter than the distance described above. The protection unit 80 is detachably mounted on the underside near the driving component 22 for easy and quick replacement in the event of a defect or damage.

A transport vehicle 1 according to a further embodiment example not shown can have at least one retractable and extendible support beam for supporting the transport vehicle 1 when stationary. The support beam can, for example, be arranged on one side of the carrying unit 30 or driving unit 20. To support the transport vehicle 1 when stationary, the support beam can be designed in particular so that it can first be extended laterally, then in the direction of the roadway, and then retracted in reverse order.

According to a further embodiment example not shown, the transport vehicle 1 has, as the unit to be transported, a tube handling unit by means of which a tube body 2 stored in a storage point 42 arranged on the upper carrying surface 32 can be handled autonomously. The tube handling unit is configured as a thread search and cut-to-length unit, which has a thread catching unit for catching a thread end from a wound tube body 2 stored in the storage point 42, a thread severing unit in the form of a cutting knife for severing a thread section unwound from the wound tube body 2 of the thread caught by the thread catching unit, and a drive for rotating the wound tube body 2 in the storage point 42. For example, the storage point 42 can have an arbour which engages the tube body 2 in a clamping manner, the arbour being rotatable via a rotary drive. This makes it very easy to unwind the thread with a defined length from the wound tube body 2.

The thread catching unit is coupled or can be coupled with a blower, by means of which a suction flow is generated within the thread catching unit for sucking in or catching the thread. Furthermore, the thread catching unit is configured to be movable relative to the storage point 42 and the thread severing unit for severing the thread stretched between the wound tube body 2 and the thread catching unit in the course of the relative movement. This allows the caught thread to be guided over the cutting knife with its thread section running between the thread catching unit and the wound tube body 2, resulting in severing of the thread. For this purpose, the thread search and cut-to-length unit also has a clamping unit that moves along with the thread catching unit and clamps the thread near the thread catching unit to prevent the thread from being pulled out of the thread catching unit in the course of the relative movement. This allows the thread severing process to be performed more reliably.

According to a further embodiment example not shown the transport vehicle 1 has a rechargeable battery, by means of which all units transported by the transport vehicle 1 and requiring operating energy are autonomously supplied with operating energy. Alternatively, according to a further embodiment example not shown, the transport vehicle 1 has an interface via which the units transported by the transport vehicle 1, with the exception of the driving unit, can be supplied with operating energy and an operating medium such as the suction air flow for the thread catching unit. For example, the supply can be provided by connecting the interface to a corresponding mating connection point on a textile machine or on another device within the textile mill.

Figure 7:
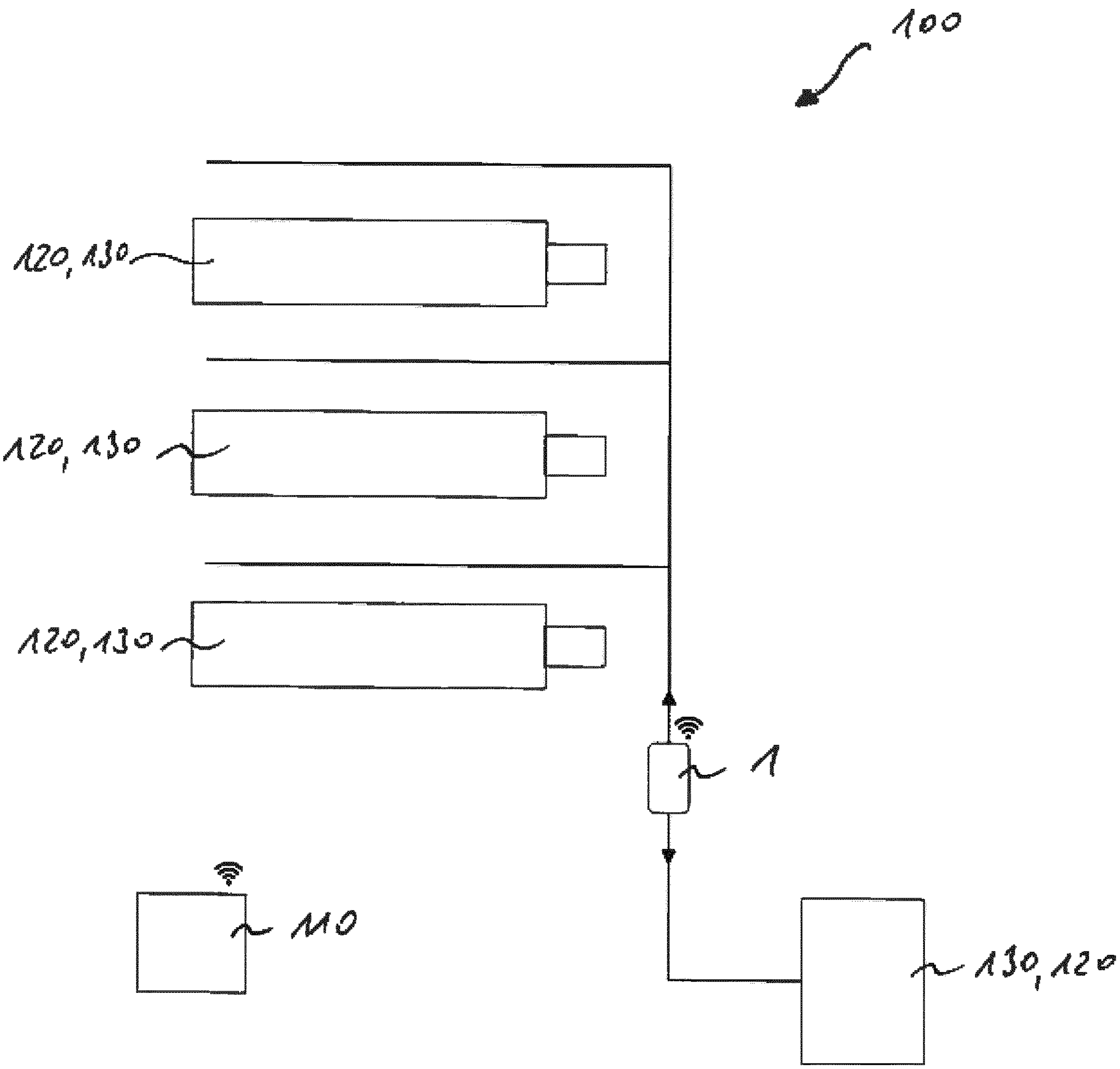
FIG. 7 shows a schematic plan view of a textile material handling system according to an embodiment example.

In this regard, with reference to FIG. 7, a textile material handling system 100 according to one embodiment example is described. The system 100 has a control system 110 and the transport vehicle 1 with the thread search and cut-to-length unit, in which case the control system 110 is adapted to move or cause the transport vehicle 1 to move to a textile machine based on a request from the textile machine and to perform a thread search and cut-to-length operation on a wound tube body 2 received at the textile machine. For this purpose, the transport vehicle 1 can have its own control unit, which moves the transport vehicle 1 in a defined manner and can be controlled or supplied with corresponding driving information by the control system 110. After reaching the textile machine, the transport vehicle 1 uses the unit to be transported, which is configured as a thread search and cut-to-length unit, to carry out the thread search and cut-to-length operation on the wound tube body 2 at the corresponding workstation of the textile machine, in this case a twisting or cabling machine. Alternatively, the transport vehicle 1 can remove the wound tube body 2 from the workstation of the textile machine and store it in the storage point 42 to perform the thread search and cut-to-length operation on the transport vehicle 1 itself. The latter has the advantage that no communication with the workstation or the textile machine is required in order to be able to pull off the caught thread from the wound tube body 2 in a defined manner.

In this case, the textile machine forms a textile material removal station 120. The wound tube body 2 with the thread cut to a defined length is transported by the transport vehicle 1 to a textile material receiving station 130 and deposited there. The textile material receiving station 130 can be a heat set creel, for example.

According to a further embodiment example, the textile material removal station 120 can be configured by a tube body magazine. In this further embodiment example, the transport vehicle 1 has a package buffer 40 as described above. The transport vehicle 1 is controlled to move to the textile material removal station 120 to remove a plurality of tube bodies 2 from the tube magazine or textile material removal station 120, or to unload them and store them in the package buffer 40 or to load the package buffer 40. Subsequently, the transport vehicle 1 is controlled to move to a textile machine forming a textile material receiving station 130, a twisting or cabling machine, in order to load the workstations of this textile machine with the stored tube bodies 2. Likewise, the transport vehicle 1 is controlled by the control system 110 to remove finished wound tube bodies 2 from another textile machine as a textile material removal station 120 and to transport them to a defined textile material receiving station 130, such as an intermediate store for temporarily storing wound tube bodies 2, to further processing within the textile mill, such as a removal transport store for storing wound tube bodies 2 until they are removed from the textile mill, or such as a heat set creel for immediate further processing of the wound tube bodies 2 and to transfer them to this station. In this case, the transport vehicle 1 and the control system 110 are wirelessly connected to one another to exchange information.

LIST OF REFERENCE SIGNS

1 Transport vehicle
2 Tube body
20 Driving unit
22 Driving component
30 Carrying unit
32 Upper carrying surface
34 Fastening points
40 Package buffer
42 Storage point
44 First storage segment unit
46 Second storage segment unit
48 Frame structure
50 Cross brace
52 Rear frame element
54 Front frame element
56 Side wall
58 Shelf
60 Loading and unloading device
62 Loading and unloading arm
64 Conveyor unit
70 Linear guide
80 Protection unit
90 Turning device
92 Rotary plate
94 Weighing unit
96 Carrying plate
100 Textile material handling system
110 Control system
120 Textile material removal station
130 Textile material receiving station

The invention claimed is:

1. A transport vehicle for a textile mill, the transport vehicle comprising:

a driving unit designed to drive autonomously to a defined destination within the textile mill;

a carrying unit arranged on the driving unit, the carrying unit having an upper carrying surface facing away from the driving unit for carrying a package unit to be transported which can have a textile material loaded thereon and unloaded therefrom; and a loading and unloading device with a loading and unloading arm having a conveyor unit for loading the textile material onto the package unit to be transported and unloading the textile material from the package unit;

wherein the package unit to be transported comprises:

a package holding assembly on the upper carrying surface, the package holding assembly having at least one storage point, each of the at least one storage point being for storing at least one wound or non-wound tube body; and wherein the loading and unloading device is fixed on the carrying unit or to the package unit to be transported, and wherein the at least one storage point can be loaded and unloaded by the loading and unloading device with the at least one wound or non-wound tube body; and wherein the loading and unloading arm with the conveyor unit is linearly movable along a linear guide extending vertically to the upper carrying surface.

2. The transport vehicle according to claim 1, wherein the at least one wound or non-wound tube body comprises at least two tube bodies, and wherein the package unit to be transported is formed at least by the package holding assembly, with the at least one storage point being adapted to store the at least two tube bodies in series along a tube body length thereof.

3. The transport vehicle according to claim 1, wherein the package unit to be transported is formed at least by the package holding assembly having at least two storage segment units each having the at least one storage point, with the at least two storage segment units and the loading and unloading device being adapted to rotate relative to one another.

4. The transport vehicle according to claim 1, wherein the transport vehicle is designed to supply at least the carrying unit, the package unit to be transported and/or the loading and unloading device with operating energy and/or an operating medium autonomously or via an interface.

5. The transport vehicle according to claim 1, further including a weighing unit by which at least a weight of the package holding assembly or a weight of at least one loaded or unloaded tube body can be detected for evaluation and/or display.

6. The transport vehicle according to claim 1, wherein the driving unit has at least one protection unit for protecting a driving component from dirt lying around on a roadway of the transport vehicle in at least one direction of travel of the transport vehicle of the driving unit.

7. The transport vehicle according to claim 1, wherein the carrying unit is detachably arranged on the driving unit.

8. A textile material handling system in a textile mill, the textile material handling system comprising:
the transport vehicle according to claim 1; and
a control system by which the transport vehicle is controlled for moving to defined locations within the textile mill.

9. The textile material handling system according to claim 8, wherein the textile material handling system forms a system for distributing textile material in the textile mill, the textile material handling system further comprising:
a textile material removal station;
a textile material receiving station; and
the transport vehicle for moving the textile material from the textile material removal station to the textile material receiving station;
at least the control system and the transport vehicle are interconnected for exchanging distribution information regarding textile material removal at the textile material removal station and textile material delivery at the textile material receiving station.

10. A transport vehicle for a textile mill, the transport vehicle comprising:
a driving unit designed to drive autonomously to a defined destination within the textile mill;
a carrying unit arranged on the driving unit, the carrying unit having an upper carrying surface facing away from the driving unit carrying a package unit to be transported which can have a textile material loaded thereon and unloaded therefrom; and
a loading and unloading device with a loading and unloading arm having a conveyor unit for loading the textile material onto the package unit to be transported and unloading the textile material from the package unit;
wherein the package unit to be transported comprises:
a package holding assembly on the upper carrying surface, the package holding assembly having at least one storage point, each of the at least one storage point being for storing at least one wound or non-wound tube body; and
wherein the loading and unloading device is fixed on the carrying unit or to the package unit to be transported, and wherein the at least one storage point can be loaded and unloaded by the loading and unloading device with the at least one wound or non-wound tube body; and
wherein at least two storage segment units of the package holding assembly are formed by a frame structure projecting vertically from the upper carrying surface, the at least one storage point is a plurality of storage points, the frame structure having on at least two vertical sides thereof extending vertically to the upper carrying surface in each case the plurality of storage points extending in a horizontal and/or vertical direction, the frame structure being arranged and set up on the upper carrying surface so as to be able to rotate relative to the loading and unloading device.

11. A transport vehicle for a textile mill, the transport vehicle comprising:
a driving unit designed to drive autonomously to a defined destination within the textile mill;
a carrying unit arranged on the driving unit, the carrying unit having an upper carrying surface facing away from the driving unit carrying a package unit to be transported which can have a textile material loaded thereon and unloaded therefrom; and
a loading and unloading device with a loading and unloading arm having a conveyor unit for loading the textile material onto the package unit to be transported and unloading the textile material from the package unit;
wherein the package unit to be transported comprises:
a package holding assembly on the upper carrying surface, the package holding assembly having at least one storage point, each of the at least one storage point being for storing at least one wound or non-wound tube body; and wherein the loading and unloading device is fixed on the carrying unit or to the package unit to be transported, and wherein the at least one storage point can be loaded and unloaded by the loading and unloading device with the at least one wound or non-wound tube body; and
wherein the package holding assembly is configured as a storage paternoster and includes at least two storage segment units, the at least two storage segment units each forming a shelf of the storage paternoster which can be moved circumferentially at a distance from the upper carrying surface.

* * * * *